Figures 1, 2, 3:
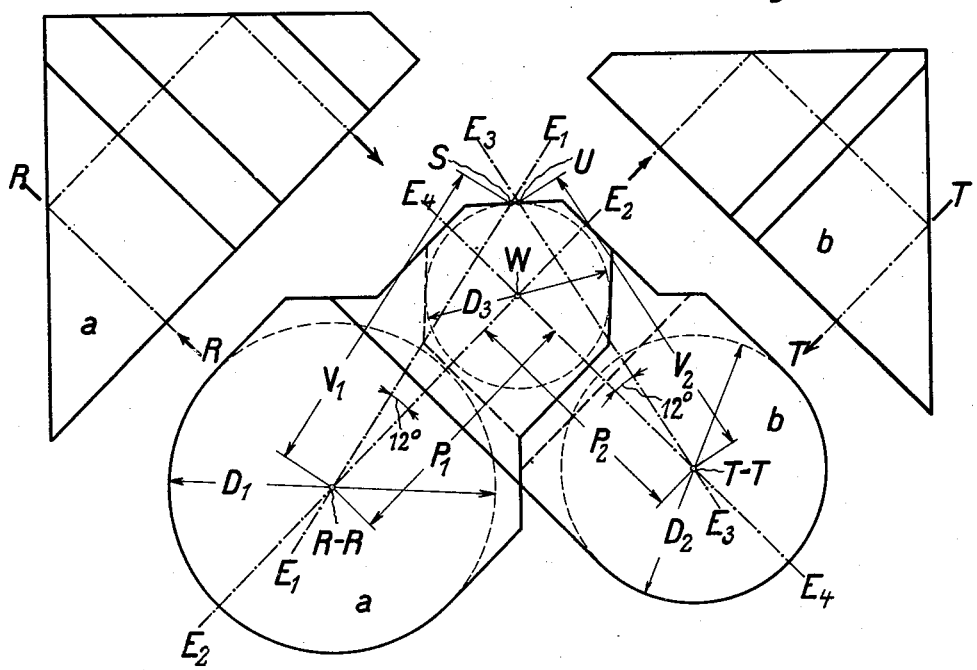

Feb. 17, 1931.                A. KÖNIG                1,793,428
TELESCOPE WITH PORRO PRISM SYSTEM
Filed Jan. 11, 1929

Inventor:
Albert König

Patented Feb. 17, 1931

1,793,428

UNITED STATES PATENT OFFICE

ALBERT KÖNIG, OF JENA, GERMANY, ASSIGNOR TO THE FIRM CARL ZEISS, OF JENA, GERMANY

TELESCOPE WITH PORRO PRISM SYSTEM

Application filed January 11, 1929, Serial No. 331,799, and in Germany January 14, 1928.

The invention relates to a telescope with a relation of the diameter of the objective to the diameter of the eyepiece diaphragm between 0.8 and 3.2, with a Porro prism system consisting of two right-angled prisms.

In order to obtain for such telescope and especially for a double telescope composed of two such telescopes a construction as compact as possible, the prism system, according to the invention, is designed in such a way that the sum of the absolute values of the two parallel displacements of the axial ray will be smaller than three and one half times the value of the quotient of the product and the sum of the two diameters.

Let $V_1$ designate the dimension of the prism belonging to the objective of the telescope in a plane which is inclined by 12° to the plane containing the axial ray immediately before and immediately after the first reflection and the axis of the entering ray, the dimension counting from this axis, and further let $V_2$ designate the dimension of the prism belonging to the eyepiece of the telescope in a plane which is inclined by 12° to the plane containing the axial ray immediately before and immediately after the last reflection and the axis of the emerging ray, the dimension counting from this axis. Then it is advisable to take care that the sum $(V_1+V_2)$ of the absolute values of these two dimensions will be smaller than four and one half times the aforesaid quotient. Further it is appropriate to see to it that each of the said two dimensions will be smaller than 1.3 times the value of the appertaining displacement of the axial ray.

The annexed drawing shows a prism system in correspondence with the present invention. Fig. 1 represents a cross section of the system whereas Fig. 2 illustrates the prism which is to be considered as belonging to the objective of the respective telescope, and Fig. 3 shows in side elevation the prism to be considered as belonging to the eyepiece.

The prism system represented by the drawing is designed for a telescope having the following values:

Diameter of objective, $O=72$ mm.

Diameter of eyepiece diaphragm, $B=48$ mm.

Focal length, $f=193.3$ mm.

The relation of the diameter of the objective $O$ to the diameter $B$ of the eyepiece diaphragm consequently is 1.5, whereas the quotient of the product and the sum of these two diameters has the value $y=28.8$.

The prism system consists of two right-angled prisms $a$ and $b$, of which $a$ is to be considered as belonging to the objective and $b$ to the eyepiece of the telescope. The cross section of the path of the rays is $D_1$ when entering, $D_2$ when emerging and $D_3$ when passing on from one prism to the other, whereby $D_3$ is smaller than $D_1$ and smaller than $D_2$ and equal to the said quotient $y$. The axis of the entering rays is denominated R—R, the axis of the emerging rays T—T. The displacements of the rays RW and WT in the objective prism $a$ and in the prism of the eyepiece $b$ are designated $P_1$ and $P_2$. The sum of the absolute values of $P_1$ and $P_2$ is equal to 2.83 $y$. The greatest dimension of the objective prism $a$, taken from the axis of the entering ray R—R in a plane $E_1$ which is inclined by 12° to the plane $E_2$ containing the axial ray in the objective prism $a$, and thereby contains the axis of the entering ray R—R is $RS=V_1=1.246 P_1$, whereas the greatest dimension of the ocular prism $b$, taken from the axis of the emerging ray T—T in a plane $E_3$ which is inclined by 12° to the plane $E_4$ containing the axial ray in the prism $b$ of the eyepiece and thereby contains the axis of the emerging ray T—T, is $TU=V_2=1.282 P_2$. The sum of the absolute values of $V_1$ and $V_2$, therefore, only amounts to 3.57 $y$. The form of the side planes bordering the prisms, as represented in the drawing, is of no importance to the invention.

I claim:

1. A telescope where the relation of diameter of objective to diameter of eyepiece diaphragm is between 0.8 and 3.2, containing a Porro prism system consisting of two right-angled prisms of such dimensions that the sum of the two parallel-displacements which the axial ray is given in the prisms will be smaller than three and one half times the value of the quotient of the product and the sum of the said two diameters.

2. A telescope where the relation of diameter of objective to diameter of eyepiece diaphragm is between 0.8 and 3.2, containing a Porro prism system consisting of two right-angled prisms of such dimensions that the sum of the two parallel-displacements which the axial ray is given in the prisms will be smaller than three and one half times the value of the quotient of the product and the sum of the said two diameters, and the sum of the absolute values of the dimension of the prism belonging to the objective in a plane which is inclined by 12° to that plane which contains the axial ray immediately before and immediately after the first reflection and the axis of the entering ray, and of the dimension of the prism belonging to the eyepiece in a plane which is inclined by 12° to that plane which contains the axial ray immediately before and immediately after the last reflection and the axis of the emerging ray, being smaller than four and one half times the value of the said quotient.

3. A telescope where the relation of diameter of objective to diameter of eyepiece diaphragm is between 0.8 and 3.2, containing a Porro prism system consisting of two right-angled prisms of such dimensions that the sum of the two parallel-displacements which the axial ray is given in the prisms will be smaller than three and one half times the value of the quotient of the product and the sum of the said two diameters, and the sum of the absolute values of the dimension of the prism belonging to the objective in a plane which is inclined by 12° to that plane which contains the axial ray immediately before and immediately after the first reflection and the axis of the entering ray, and of the dimension of the prism belonging to the eyepiece in a plane which is inclined by 12° to that plane which contains the axial ray immediately before and immediately after the last reflection and the axis of the emerging ray, being smaller than four and one half times the value of the said quotient, and each of the said two dimensions being smaller than 1.3 times the value of the appertaining displacements of the axial ray.

ALBERT KÖNIG.